(12) United States Patent
Kato et al.

(10) Patent No.: US 10,268,648 B2
(45) Date of Patent: Apr. 23, 2019

(54) COMPUTER READABLE PROGRAM, PLAYLIST PREPARATION DEVICE, AND WIRELESS AUDIO SYSTEM

(71) Applicant: D&M Holdings, Inc., Kanagawa (JP)

(72) Inventors: Tsuyoshi Kato, Kanagawa (JP); Masato Fujii, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 15/747,986

(22) PCT Filed: Mar. 15, 2016

(86) PCT No.: PCT/JP2016/058068
§ 371 (c)(1),
(2) Date: Jan. 26, 2018

(87) PCT Pub. No.: WO2017/022271
PCT Pub. Date: Feb. 9, 2017

(65) Prior Publication Data
US 2018/0225376 A1    Aug. 9, 2018

(30) Foreign Application Priority Data
Aug. 4, 2015  (JP) ................................ 2015-154584

(51) Int. Cl.
*G06F 16/638*   (2019.01)
*G06F 16/635*   (2019.01)
(Continued)

(52) U.S. Cl.
CPC ............ *G06F 16/639* (2019.01); *G06F 13/00* (2013.01); *G06F 16/00* (2019.01); *G06F 16/636* (2019.01);
(Continued)

(58) Field of Classification Search
USPC ...... 381/26, 27, 91, 300, 306, 333; 709/208, 709/209, 218, 231
See application file for complete search history.

(56) References Cited

U.S. PATENT DOCUMENTS 7,987,294 B2    7/2011  Bryce et al.
2005/0158037 A1  7/2005  Okabayashi et al.
(Continued)

FOREIGN PATENT DOCUMENTS

JP    2005-204021 A    7/2005
JP    2009-266005 A    12/2009
(Continued)

OTHER PUBLICATIONS

Translated international search report for PCT/JP2016/058068, dated May 31, 2016.

*Primary Examiner* — Yosef K Laekemariam
(74) *Attorney, Agent, or Firm* — Peter A. Nieves; Sheehan Phinney Bass & Green PA

(57) ABSTRACT

[Problem] To reduce user's workload when preparing a playlist. [Solution] A playlist preparation terminal 2 carries out face recognition processes on the image data of listeners captured for each room from a room A to a room C, and generates listener information including the atmosphere, age group, and a male-to-female ratio of a listener group made up of the listeners captured in the image data. The playlist preparation terminal 2 then prepares a playlist by selecting music data from among music data belonging to the genre information preliminarily associated with the listener information, and multicasts the playlist together with the designation data for the wireless speakers 1-1 to 1-3 from which to output music. As a result, the playlist preparation terminal 2 allows the wireless speakers 1-1 to 1-3 from which to
(Continued)

output the music to reproduce the music data according to the playlist and output the music.

2 Claims, 7 Drawing Sheets

(51) Int. Cl.

| | | |
|---|---|---|
| *G06F 13/00* | (2006.01) | |
| *G11B 27/02* | (2006.01) | |
| *G10K 15/02* | (2006.01) | |
| *G10K 15/04* | (2006.01) | |
| *G10L 19/00* | (2013.01) | |
| *G06K 9/00* | (2006.01) | |
| *H04R 5/02* | (2006.01) | |
| *G06F 16/00* | (2019.01) | |

(52) U.S. Cl.
CPC ......... *G06K 9/00302* (2013.01); *G10K 15/02* (2013.01); *G10K 15/04* (2013.01); *G10L 19/00* (2013.01); *G11B 27/02* (2013.01); *H04R 5/02* (2013.01); *H04R 2420/07* (2013.01)

(56) References Cited

U.S. PATENT DOCUMENTS

| | | |
|---|---|---|
| 2011/0190913 A1 | 8/2011 | Van De Sluis et al. |
| 2012/0237090 A1 | 9/2012 | Ikenoue et al. |
| 2014/0188876 A1* | 7/2014 | Rodrigues ......... G06F 17/30943 |
| | | 707/736 |

FOREIGN PATENT DOCUMENTS

| | | | |
|---|---|---|---|
| JP | 2010-226484 A | 10/2010 | |
| JP | 2011-514541 A | 5/2011 | |
| JP | 2011-118710 A | 6/2011 | |
| JP | 2014-130467 A | 7/2014 | |
| WO | WO 2014/130467 | * 8/2014 | ............... H04N 7/14 |

* cited by examiner

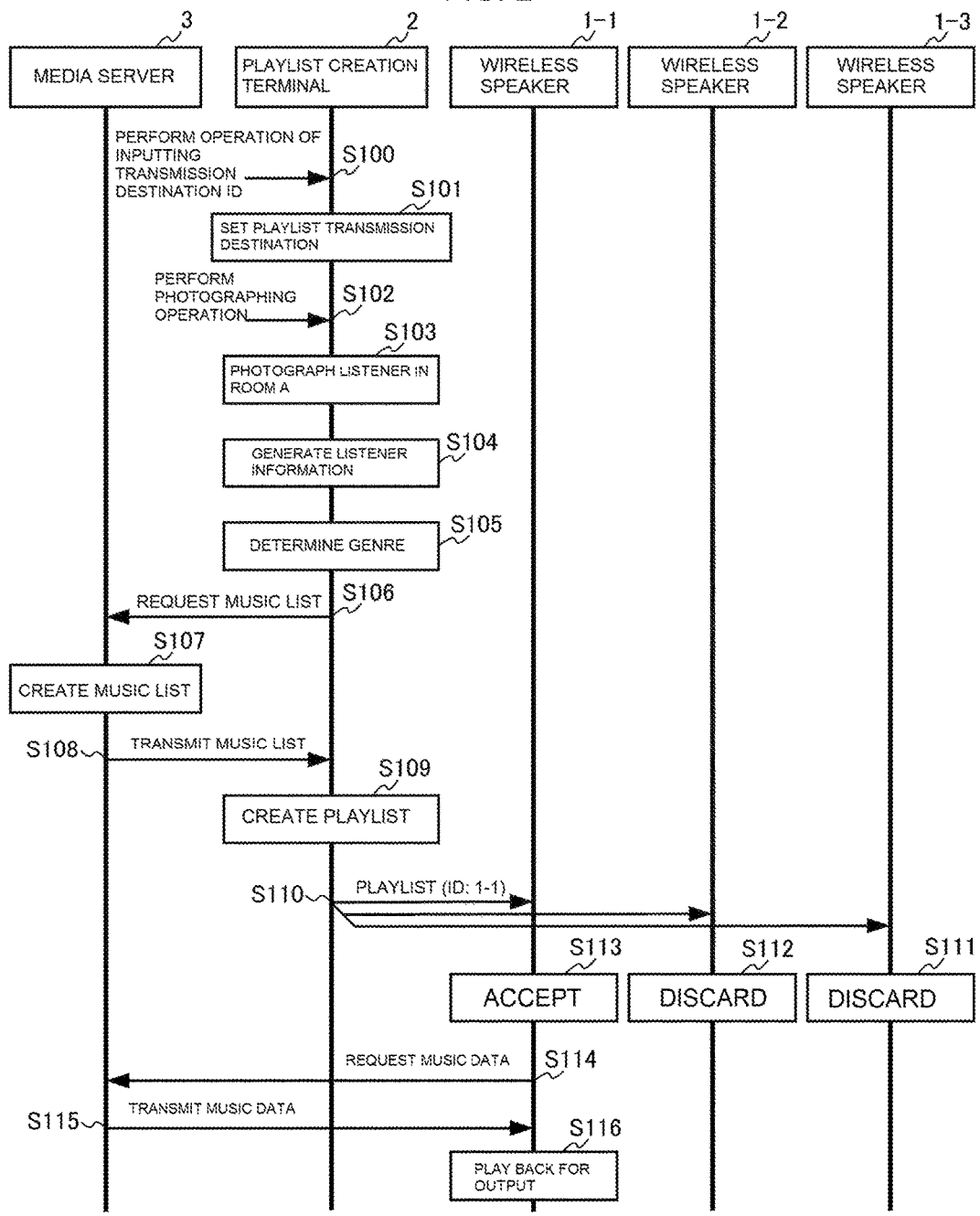

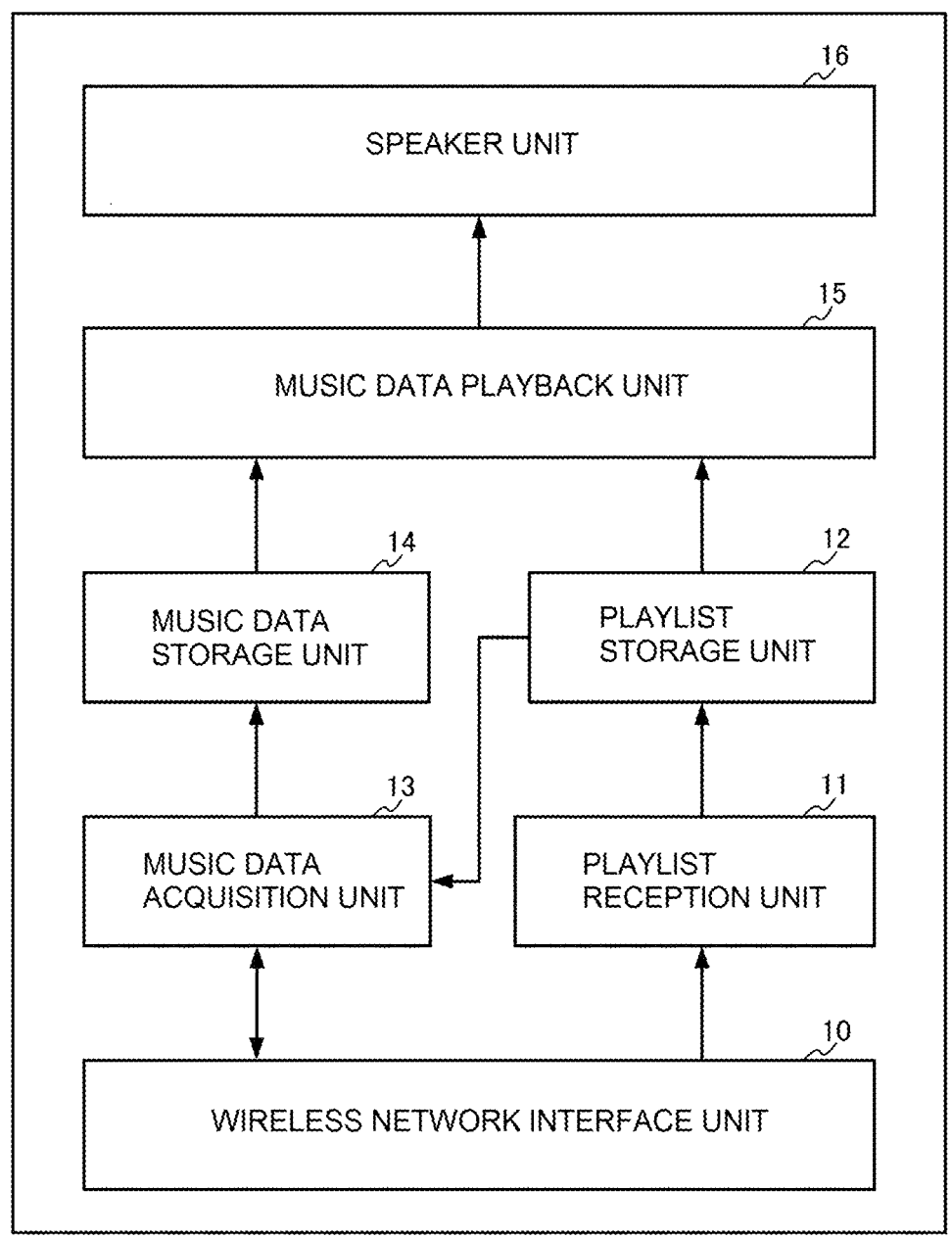

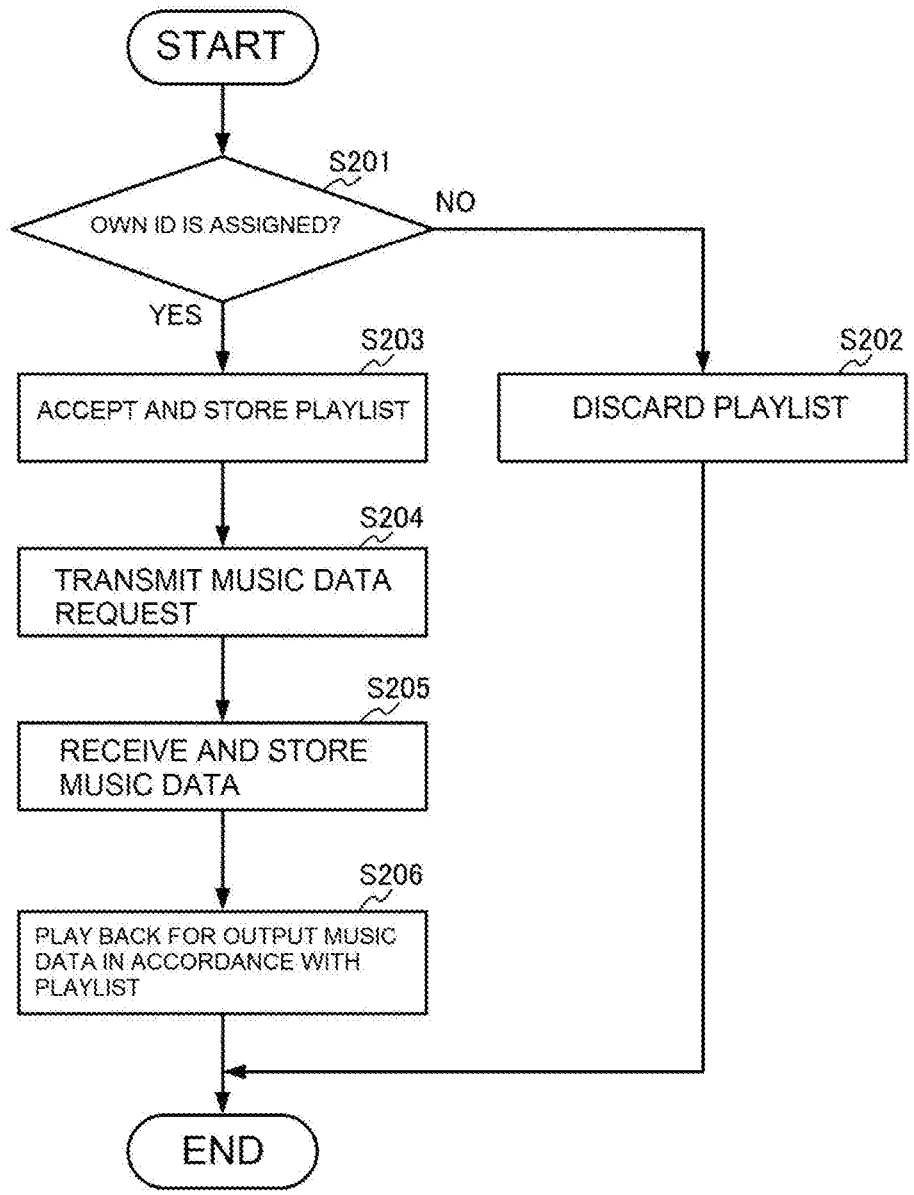

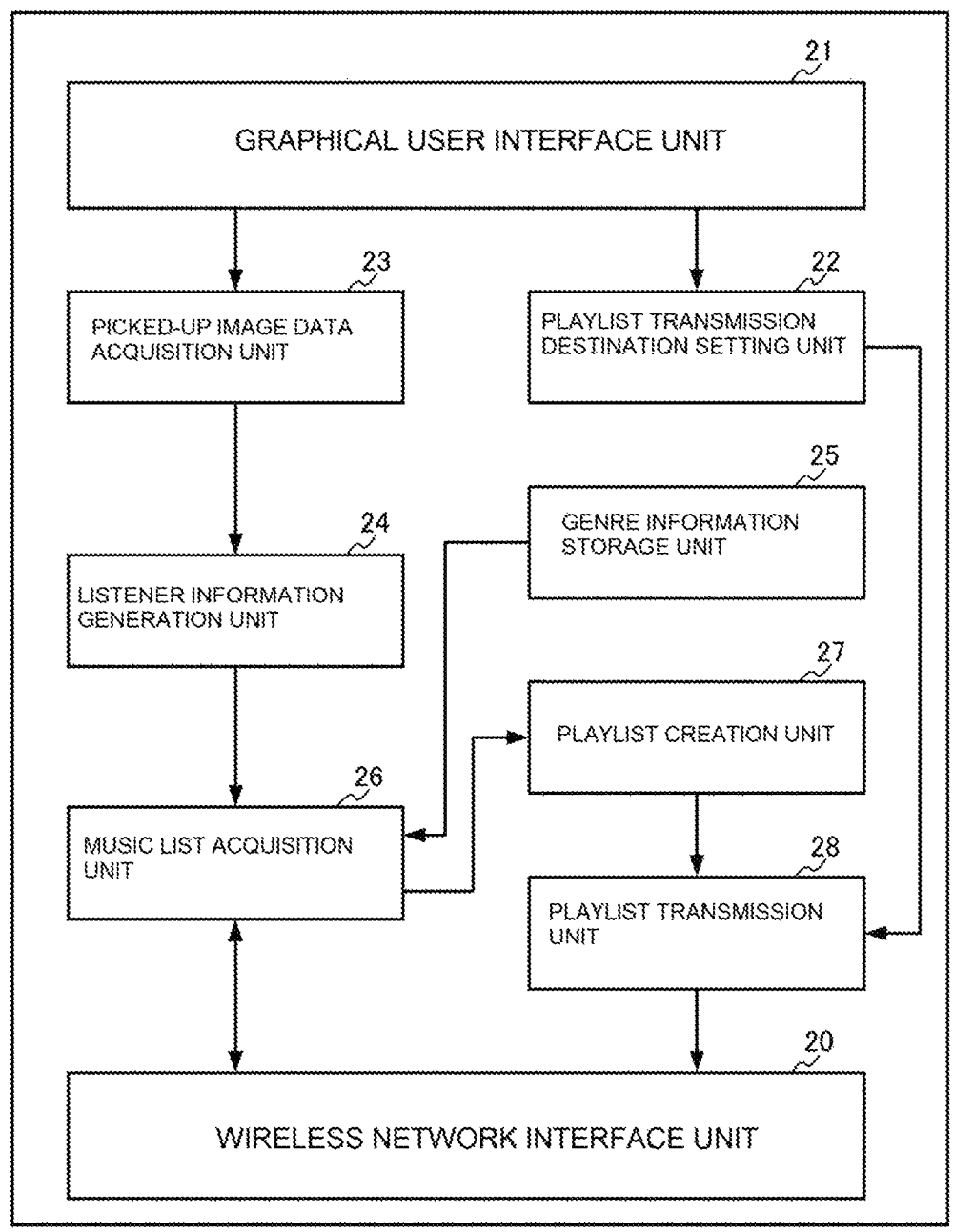

FIG. 6

GENRE INFORMATION STORAGE UNIT 25

| LISTENER INFORMATION | | | GENRE INFORMATION | | |
|---|---|---|---|---|---|
| ATMOSPHERE | AGE GROUP | GENDER RATIO | GENRE | PERIOD | |
| "HAPPY" OR "JOYFUL" | UNIDENTIFIABLE | UNIDENTIFIABLE | "POP", "ROCK" | NOT SPECIFIED | 250 |
| "HAPPY" OR "JOYFUL" | ELDERLY | UNIDENTIFIABLE | "POP", "ROCK" | 1960s | 250 |
| "HAPPY" OR "JOYFUL" | MIDDLE AGE | UNIDENTIFIABLE | "POP", "ROCK" | 1970s | 250 |
| "HAPPY" OR "JOYFUL" | MATURE AGE | UNIDENTIFIABLE | "POP", "ROCK" | 1980s | 250 |
| "HAPPY" OR "JOYFUL" | YOUNG AGE | UNIDENTIFIABLE | "POP", "ROCK" | 1990s | 250 |
| "HAPPY" OR "JOYFUL" | CHILD AGE | UNIDENTIFIABLE | "POP", "ROCK" | 2000s | 250 |
| "HAPPY" OR "JOYFUL" | UNIDENTIFIABLE | MAINLY MEN | "ROCK" | NOT SPECIFIED | 250 |
| "HAPPY" OR "JOYFUL" | ELDERLY | MAINLY MEN | "ROCK" | 1960s | 250 |
| "HAPPY" OR "JOYFUL" | MIDDLE AGE | MAINLY MEN | "ROCK" | 1970s | 250 |
| "HAPPY" OR "JOYFUL" | MATURE AGE | MAINLY MEN | "ROCK" | 1980s | 250 |
| "HAPPY" OR "JOYFUL" | YOUNG AGE | MAINLY MEN | "ROCK" | 1990s | 250 |
| "HAPPY" OR "JOYFUL" | CHILD AGE | MAINLY MEN | "ROCK" | 2000s | 250 |
| "HAPPY" OR "JOYFUL" | UNIDENTIFIABLE | MAINLY WOMEN | "POP" | NOT SPECIFIED | 250 |
| "HAPPY" OR "JOYFUL" | ELDERLY | MAINLY WOMEN | "POP" | 1960s | 250 |
| "HAPPY" OR "JOYFUL" | MIDDLE AGE | MAINLY WOMEN | "POP" | 1970s | 250 |
| "HAPPY" OR "JOYFUL" | MATURE AGE | MAINLY WOMEN | "POP" | 1980s | 250 |
| "HAPPY" OR "JOYFUL" | YOUNG AGE | MAINLY WOMEN | "POP" | 1990s | 250 |
| "HAPPY" OR "JOYFUL" | CHILD AGE | MAINLY WOMEN | "POP" | 2000s | 250 |
| "HAPPY" OR "JOYFUL" | * | MIXED | "MOOD MUSIC" | NOT SPECIFIED | 250 |
| "ANGRY" OR "SAD" | * | * | "CLASSICAL" | NOT SPECIFIED | 250 |

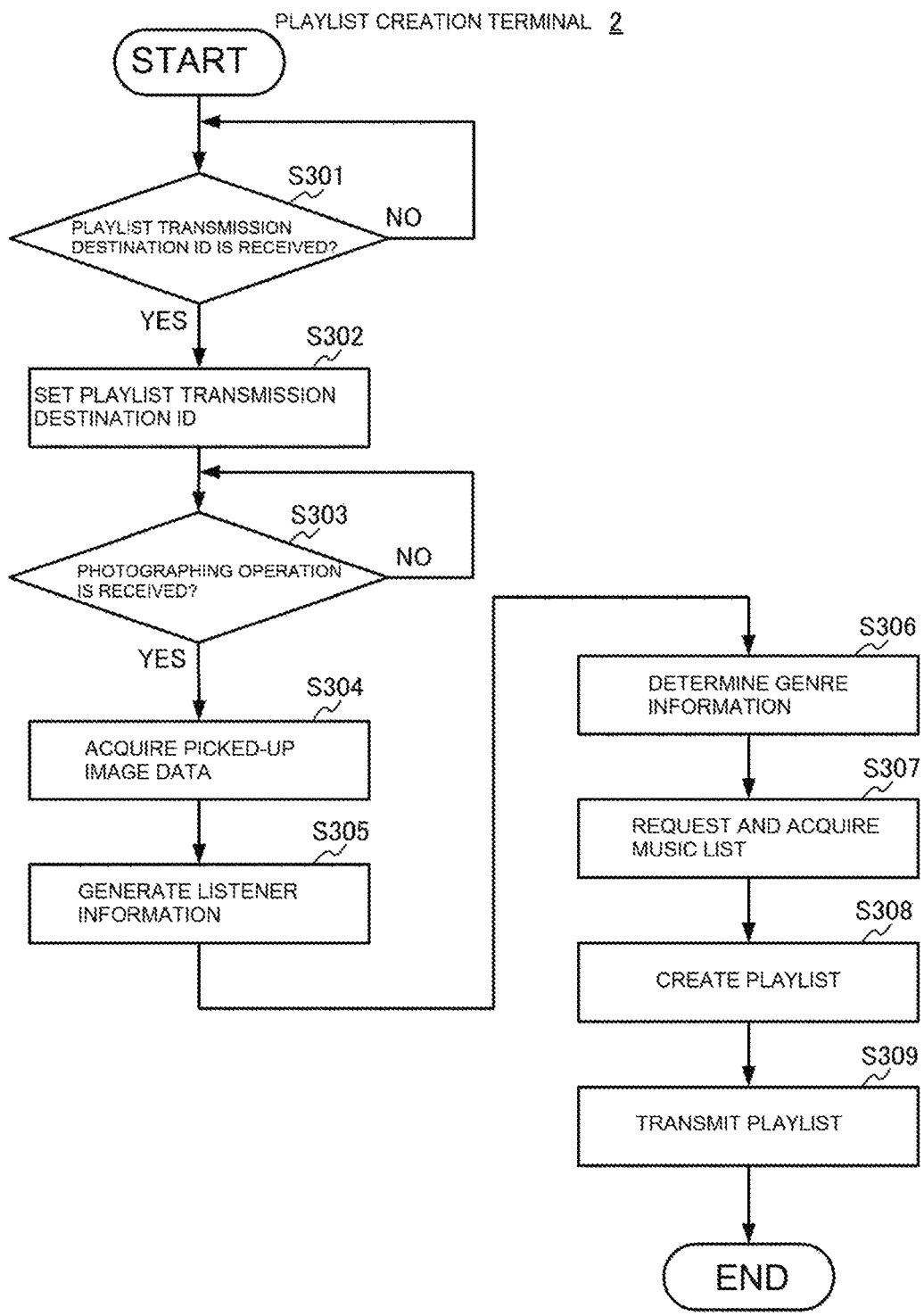

COMPUTER READABLE PROGRAM, PLAYLIST PREPARATION DEVICE, AND WIRELESS AUDIO SYSTEM

CROSS-REFERENCE TO RELATED APPLICATIONS

This application is the National Stage of International Application No. PCT/JP2016/058068, filed Mar. 15, 2016, which claims the benefit of Japanese Patent Application No. 2015-154584, filed Aug. 4, 2015. The contents of these prior applications are incorporated by reference herein in their entirety.

TECHNICAL FIELD

The present invention relates to a technology for creating a playlist of music to be played back by an audio device.

BACKGROUND ART

In Patent Literature 1, there is disclosed a wireless audio system, which includes a plurality of wireless speakers grouped into a plurality of groups, and is capable of playing back music data that is different for each group. In the wireless audio system, for each group, the plurality of wireless speakers belonging to the group perform arbitration to select one wireless speaker from among those wireless speakers. Then, the selected wireless speaker serves as a group leader to receive from a user an operation for the plurality of wireless speakers belonging to the same group and transmit a control signal to those wireless speakers.

CITATION LIST

Patent Literature

[PTL 1] U.S. Pat. No. 7,987,294 B2

SUMMARY OF INVENTION

Technical Problem

With the wireless audio system described in Patent Literature 1, for example, when a plurality of wireless speakers are installed in a plurality of rooms, and the wireless speakers installed in the same room are set as belonging to the same group, music data that is different for each room can be played back.

However, in the technology described in Patent Literature 1, there is no consideration of what type of music data is to be played back in each room. Work of creating a playlist by selecting music data that can satisfy all listeners in the same room from among an enormous amount of music data stored in a media server or the like is greatly troublesome. A load on a user in charge of such work is heavy.

The present invention has been made in view of the above-mentioned circumstances, and it is an object of the present invention to alleviate a user's workload in creating a playlist.

Solution to Problem

In order to solve the above-mentioned problem, according to one embodiment of the present invention, image recognition processing is performed on picked-up image data on a listener to generate listener information including at least one of a facial expression, an age group, or a gender of the listener contained in the picked-up image data, and a playlist is created based on music belonging to a genre associated in advance with the listener information.

For example, one embodiment of the present invention relates to a program readable by a computer, for causing the computer to function as a playlist creation device including:

picked-up image data acquisition means for acquiring picked-up image data on a listener;

listener information generation means for performing image recognition processing on the picked-up image data acquired by the picked-up image data acquisition means to generate listener information including at least one of a facial expression, an age group, or a gender of the listener contained in the picked-up image data;

music list acquisition means for acquiring, from a server that stores music data, a music list of music data belonging to a genre associated in advance with the listener information generated by the listener information generation means; and playlist creation means for creating a playlist based on the music list acquired by the music list acquisition means.

In this case, the picked-up image data acquisition means may be configured to pick up an image of the listener through use of a camera function of the computer to acquire the picked-up image data on the listener.

Further, the playlist creation device may further include playlist transmission means for transmitting the playlist created by the playlist creation means to a predetermined audio device, for example, a wireless speaker having an audio playback function. In this case, the predetermined audio device downloads music data on music described in the playlist from a server storing music data to play back the music.

Advantageous Effects of Invention

According to the present invention, listener information including at least one of the facial expression, the age group, or the gender of a listener is generated from the picked-up image data on the listener, and a piece of music is selected from among pieces of music belonging to the genre associated in advance with the listener information to create the playlist. Thus, a playlist can be generated automatically just by picking up an image of a listener by a user. Therefore, according to the present invention, it is possible to alleviate a user's workload in creating a playlist.

BRIEF DESCRIPTION OF DRAWINGS

FIG. 2 is a sequence diagram for illustrating an operation of the wireless audio system illustrated in FIG. 1.

FIG. 3 is a schematic functional configuration diagram of a wireless speaker 1.

FIG. 4 is a flowchart for illustrating an operation of the wireless speaker 1.

FIG. 5 is a schematic functional configuration diagram of a playlist creation terminal 2.

FIG. 6 is a table for schematically showing an example of content registered in a genre information storage unit 25.

FIG. 7 is a flowchart for illustrating an operation of the playlist creation terminal 2.

DESCRIPTION OF EMBODIMENTS

Figure 1:
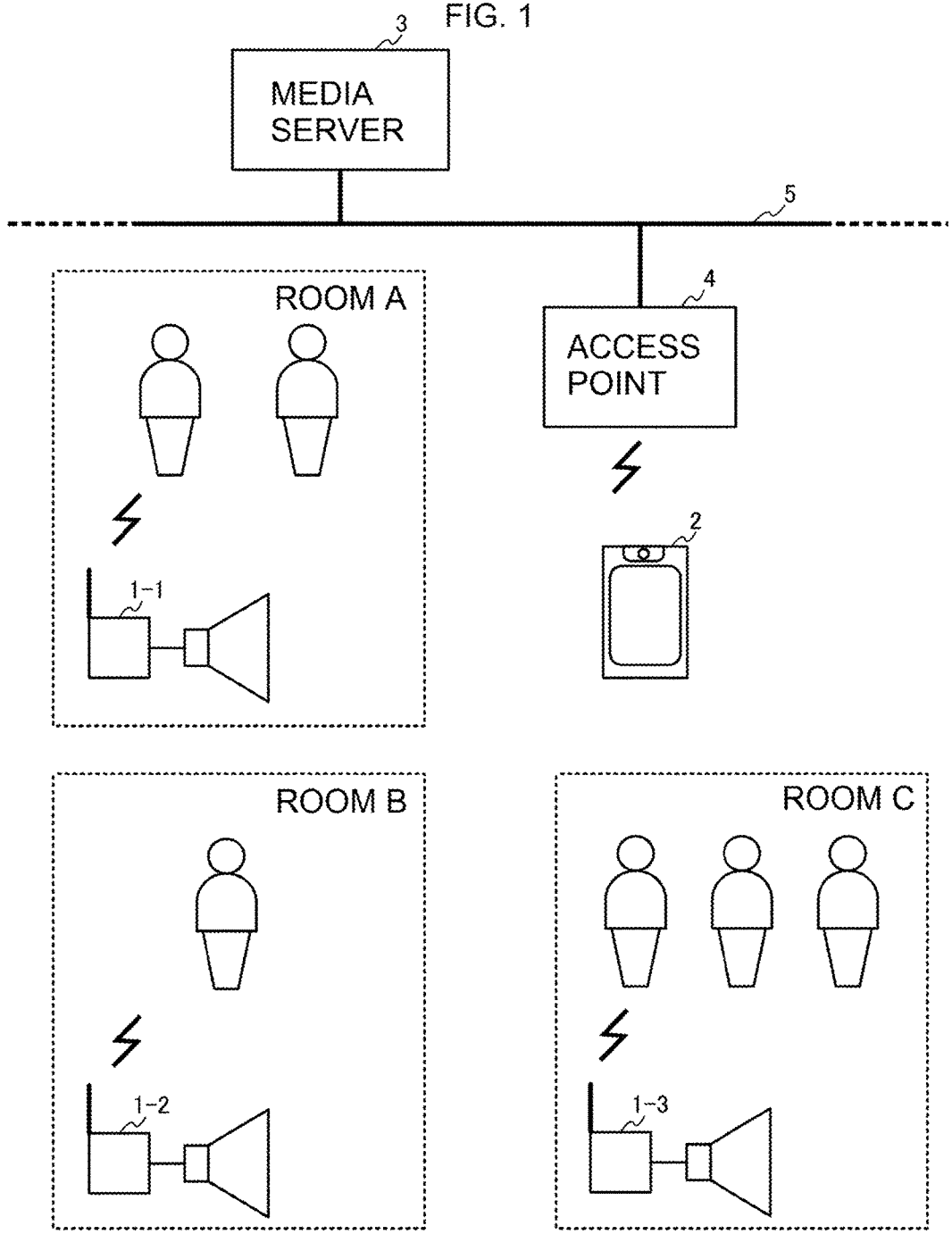
FIG. 1 is a schematic configuration diagram of a wireless audio system according to one embodiment of the present invention.

Now, an embodiment of the present invention is described referring to the drawings.

FIG. 1 is a schematic configuration diagram of a wireless audio system according to this embodiment.

As illustrated in FIG. 1, the wireless audio system according to this embodiment includes a plurality of wireless speakers 1-1 to 1-3 (hereinafter sometimes referred to simply as "wireless speaker(s) 1") each having an ID assigned thereto, a playlist creation terminal 2, which is a portable terminal having a camera function, and a media server 3 and an access point 4, which are connected to a network 5. It is assumed that the wireless speakers 1-1 to 1-3 are installed in rooms A to C, respectively.

Each of the wireless speakers 1 is connected to the playlist creation terminal 2 and the media server 3 via the access point 4, and acquires music data from the media server 3 and plays back the music data for output in accordance with a playlist received from the playlist creation terminal 2.

The playlist creation terminal 2 is also connected to the wireless speaker 1 and the media server 3 via the access point 4, and creates, in cooperation with the media server 3, a playlist of music to be played to a listener based on picked-up image data on the listener acquired by picking up an image of the listener through use of the camera function. Then, the playlist creation terminal 2 transmits the created playlist to one of the wireless speakers 1 from which music data is to be played back for output.

FIG. 2 is a sequence diagram for illustrating an operation of the wireless audio system illustrated in FIG. 1. In the following, a description is given of, as an example, an operation performed when a user of the playlist creation terminal 2 causes the playlist creation terminal 2 to create a playlist of music to be played to listeners in the room A, and causes the wireless speaker 1-1 installed in the room A to play back for output the music data in accordance with the playlist.

First, the user of the playlist creation terminal 2 confirms the ID assigned to the wireless speaker 1-1 installed in the room A, and inputs the ID to the playlist creation terminal 2 (Step S100). In response to this input, the playlist creation terminal 2 sets the ID of the wireless speaker 1-1 as a playlist transmission destination ID (Step S101).

Next, when the user of the playlist creation terminal 2 performs an operation for photographing listeners in the room A as objects (Step S102), the playlist creation terminal 2 uses the camera function to photograph the listeners in the room A (Step S103). Then, the playlist creation terminal 2 performs face recognition processing on photographing data on the listeners in the room A to generate listener information including an atmosphere, an age group, and a gender ratio of a listener group of the listeners in the room A (Step S104).

Specifically, based on a result of the face recognition processing performed on the photographing data, a facial expression, an age group, and a gender of each of the listeners in the room A are identified. The facial expression of each listener can be classified into various expressions such as happy, angry, sad, joyful, bright, dark, relaxed, and nervous, but in this case, a case in which the facial expression of each listener is classified into any one of four expressions of happy, angry, sad, and joyful is taken as an example. Then, when a predetermined ratio (e.g., 2/3) or more of the listeners have the same facial expression (one of happy, angry, sad, and joyful), the facial expression is determined as the atmosphere of the listener group, and otherwise, it is determined that the atmosphere of the listener group cannot be identified. Similarly, when a predetermined ratio (e.g., 2/3) or more of the listeners have the same age group, the age group is determined as the age group of the listener group, and otherwise, it is determined that the age group of the listener group cannot be identified. Further, when a predetermined ratio (e.g., 2/3) or more of the listeners have a male gender, the gender ratio of the listener group is determined as "mainlymen", and when a predetermined ratio (e.g., 2/3) or more of the listeners have a female gender, the gender ratio of the listener group is determined as "mainly women". Otherwise, the gender ratio of the listener group is determined as "mixed".

Existing technologies described in, for example, JP 2005-148880 A and JP 2013-242719 A can be used for the face recognition processing.

Next, the playlist creation terminal 2 determines genre information registered in advance in association with the listener information created as described above, as genre information to be described in a playlist (Step S105). In the playlist creation terminal 2, a correspondence relationship between listener information and genre information including a genre and a period of music is registered. For example, when an atmosphere included in listener information is "happy" or "joyful", genre information associated with the listener information includes a genre corresponding to a gender ratio included in the listener information (a genre of "rock" when the gender ratio is "mainly men", a genre of "pop" when the gender ratio is "mainly women", and a genre of "mood music" when the gender ratio is "mixed"). Further, when the atmosphere included in the listener information is "angry" or "sad", genre information associated with the listener information includes a genre of "classical" irrespective of the gender ratio included in the listener information. Further, the genre information including the genre of anyone of "pop" and "rock" includes a period when a listener of an age group included in the corresponding listener information was in his or her teens (e.g., 1970s, 1980s, 1990s, or 2000s), and the genre information including the genre of any one of "classical" and "mood music" includes a period of "not specified" irrespective of the age group included in the corresponding listener information.

Next, the playlist creation terminal 2 transmits a music list request involving designation of the genre information (genre and period) determined as described above to the media server 3 via the access point 4 and the network 5 (Step S106).

When receiving the music list request from the playlist creation terminal 2, the media server 3 retrieves, from among pieces of music data stored in advance in the media server 3 in association with the genre information, pieces of music data associated with the genre information designated in the music list request to create a music list of the retrieved pieces of music data (Step S107). Then, the media server 3 transmits the created music list to the playlist creation terminal 2 (Step S108).

When receiving the music list from the media server 3, the playlist creation terminal 2 creates a playlist based on the received music list (Step S109). For example, when the number of pieces of music described in the music list is smaller than a predetermined value, the playlist creation terminal 2 sets this music list as the playlist. Meanwhile, when the number of pieces of music described in the music list is equal to or larger than the predetermined value, the playlist creation terminal 2 randomly selects a predetermined number of pieces of music from the music list to create the playlist. Next, the playlist creation terminal 2 assigns to the created playlist the ID of the wireless speaker 1-1 of the room A, which is set as the playlist transmission destination ID, and multicasts the resultant playlist to each of the wireless speakers 1-1 to 1-3 via the access point 4 (Step S110).

In this case, each of the wireless speakers other than the wireless speaker 1-1 of the room A, namely, the wireless speakers 1-2 and 1-3, discards the playlist multicast from the playlist creation terminal 2 because the ID is not an ID of the each of the wireless speakers 1-2 and 1-3 (Step S111 and Step S112). Meanwhile, the wireless speaker 1-1 of the room A accepts the playlist multicast from the playlist creation terminal 2 because the ID is the ID of the wireless speaker 1-1 (Step S113).

Next, the wireless speaker 1-1 of the room A transmits a music data request including the playlist received from the playlist creation terminal 2 to the media server 3 via the access point 4 and the network 5 (Step S114).

In response to this request, the media server 3 identifies, from among the pieces of music data stored in the media server 3, pieces of music data that are described in the playlist designated in the music data request received from the wireless speaker 1-1 of the room A, and transmits those pieces of music data to the wireless speaker 1-1 of the room A (Step S115).

In response to this, the wireless speaker 1-1 of the room A plays back for output the pieces of music data received from the media server 3 in an order described in the playlist (Step S116).

Next, details of the wireless speaker 1 and the playlist creation terminal 2 of the wireless audio system according to this embodiment are described. An existing media server and access point can be used as the media server 3 and the access point 4, and hence detailed descriptions thereof are omitted.

First, the wireless speaker 1 is described.

FIG. 3 is a schematic functional configuration diagram of the wireless speaker 1. A functional configuration of the wireless speaker 1 illustrated in FIG. 3 is, for example, implemented in the following manner: in a computer including a CPU, a memory, an auxiliary storage device, for example, a flash memory, a wireless communication device, for example, a wireless LAN adapter, and a speaker, the CPU loads a predetermined program onto the memory from the auxiliary storage device to execute the program.

As illustrated in FIG. 3, the wireless speaker 1 includes a wireless network interface unit 10, a playlist reception unit 11, a playlist storage unit 12, a music data acquisition unit 13, a music data storage unit 14, a music data playback unit 15, and a speaker unit 16.

The wireless network interface unit 10 is an interface for, for example, communicating to/from the playlist creation terminal 2 and communicating to/from the media server 3 connected to the network 5 via the access point 4.

The playlist reception unit 11 accepts a playlist assigned with the ID of the own wireless speaker 1 from the playlist creation terminal 2 via the wireless network interface unit 10.

The playlist storage unit 12 stores the playlist received by the playlist reception unit 11 from the playlist creation terminal 2.

The music data acquisition unit 13 transmits, to the media server 3 via the wireless network interface unit 10, a music data request including the playlist stored in the playlist storage unit 12, to thereby acquire from the media server 3 music data on music described in the playlist.

The music data storage unit 14 stores the music data acquired by the music data acquisition unit 13 from the media server 3.

The music data playback unit 15 plays back the music data stored in the music data storage unit 14 in accordance with the playlist stored in the playlist storage unit 12 to output the music data from the speaker unit 16.

FIG. 4 is a flowchart for illustrating an operation of the wireless speaker 1. This flow is started when the wireless network interface unit 10 receives a playlist multicast from the playlist creation terminal 2.

First, the wireless network interface unit 10 passes the received playlist to the playlist reception unit 11. In response to this, the playlist reception unit 11 determines whether or not a playlist transmission destination ID assigned to the playlist received from the wireless network interface unit 10 is an ID of the own wireless speaker 1 (Step S201). Then, when the playlist transmission destination ID is not the ID of the own wireless speaker 1 (NO in Step S201), the playlist reception unit 11 discards this playlist (Step S202), and ends the processing.

Meanwhile, when the playlist transmission destination ID is the ID of the own wireless speaker 1 (YES in Step S201), the playlist reception unit 11 accepts this playlist and stores the playlist in the playlist storage unit 12 (Step S203).

When a new playlist is stored in the playlist storage unit 12, the music data acquisition unit 13 transmits a music data request including this playlist to the media server 3 via the wireless network interface unit 10 (Step S204). Then, when receiving music data from the media server 3, the music data acquisition unit 13 stores the received music data into the music data storage unit 14 (Step S205).

When new music data is stored into the music data storage unit 14, the music data playback unit 15 plays back the music data stored in the music data storage unit 14 in accordance with the playlist stored in the playlist storage unit 12 to output the music data from the speaker unit 16 (Step S206).

Next, the playlist creation terminal 2 is described.

FIG. 5 is a schematic functional configuration diagram of the playlist creation terminal 2. The functional configuration of the playlist creation terminal 2 illustrated in FIG. 5 is, for example, implemented in the following manner: in a portable computer, for example, a smartphone or a tablet PC, which includes a CPU, a memory, an auxiliary storage device, for example, a flash memory, a touch panel, a display, an input/output device, for example, a pointing device, a wireless communication device, for example, a wireless LAN adapter, and a camera, the CPU loads a predetermined program onto the memory from the auxiliary storage device to execute the program.

As illustrated in FIG. 5, the playlist creation terminal 2 includes a wireless network interface unit 20, a graphical user interface unit 21, a playlist transmission destination setting unit 22, a picked-up image data acquisition unit 23, a listener information generation unit 24, a genre information storage unit 25, a music list acquisition unit 26, a playlist creation unit 27, and a playlist transmission unit 28.

The wireless network interface unit 20 is an interface for, for example, communicating to/from the wireless speaker 1 via the access point 4 and communicating to/from the media server 3 connected to the network 5.

The graphical user interface unit 21 is an interface for, for example, displaying information and receiving various operations from the user.

The playlist transmission destination setting unit 22 sets, for the playlist transmission unit 28, the ID of the wireless speaker 1 received as the playlist transmission destination ID from the user via the graphical user interface unit 21.

The picked-up image data acquisition unit 23 uses the camera function of the playlist creation terminal 2 in accordance with a photographing operation received from the user via the graphical user interface unit 21 to photograph a listener, to thereby acquire photographing data on the listener.

The listener information generation unit 24 performs face recognition processing on picked-up image data on listeners acquired by the picked-up image data acquisition unit 23, to thereby generate listener information including an atmosphere (one of happy, angry, sad, and joyful), an age group, and a gender ratio of a listener group of the listeners contained in the picked-up image data. Specifically, a facial expression (one of happy, angry, sad, and joyful), an age group, and a gender of each of the listeners contained in the picked-up image data are identified based on the face recognition processing performed on the picked-up image data. Then, when a predetermined ratio (e.g., 2/3) or more of the listeners have the same facial expression, the facial expression is determined as the atmosphere of the listener group, and otherwise, it is determined that the atmosphere of the listener group cannot be identified. Similarly, when a predetermined ratio (e.g., 2/3) or more of the listeners have the same age group, the age group is determined as the age group of the listener group, and otherwise, it is determined that the age group of the listener group cannot be identified. Further, when a predetermined ratio (e.g., 2/3) or more of the listeners have a male gender, the gender ratio of the listener group is determined as "mainlymen", and when a predetermined ratio (e.g., 2/3) or more of the listeners have a female gender, the gender ratio of the listener group is determined as "mainly women". Otherwise, the gender ratio of the listener group is determined as "mixed".

As described above, existing technologies described in, for example, JP 2005-148880 A and JP 2013-242719 A can be used for the face recognition processing.

In the genre information storage unit 25, genre information of music is registered in association with listener information. FIG. 6 is a table for schematically showing an example of content registered in the genre information storage unit 25. As shown in FIG. 6, in the genre information storage unit 25, records 250 of the genre information of music are stored. Each of the records 250 includes a field 251 in which listener information is registered and a field 252 in which genre information of music is registered. Further, the field 251 includes a subfield 253 in which an atmosphere (one of happy, angry, sad, and joyful) is registered, a subfield 254 in which an age group is registered, and a subfield 255 in which a gender ratio is registered. The field 252 includes a subfield 256 in which a genre of music is registered and a subfield 257 in which a period of music is registered. In FIG. 6, the symbol "*" indicates a wildcard corresponding to any information.

In FIG. 6, for example, in the subfields 256 and 257 of the field 252 of the record 250 in which an atmosphere of "happy" or "joyful", an age group of "unidentifiable", and a gender ratio of "unidentifiable" are registered in the subfields 253 to 255 of the field 251, respectively, the genre of "pop" or "rock" and the period of "not specified" are registered. Further, for example, in the subfields 256 and 257 of the field 252 of the record 250 in which the atmosphere of "happy" or "joyful", an age group of "middle age", and a gender ratio of "mainly men" are registered in the subfields 253 to 255 of the field 251, respectively, the genre of "rock" and a period of "1970s" are registered. Further, for example, in the subfields 256 and 257 of the field 252 of the record 250 in which the atmosphere of "happy" or "joyful", an age group of "young age", and a gender ratio of "mainly women" are registered in the subfields 253 to 255 of the field 251, respectively, the genre of "pop" and a period of "1990s" are registered. Further, for example, in the subfields 256 and 257 of the field 252 of the record 250 in which the atmosphere of "happy" or "joyful", an age group of "*", and a gender ratio of "mixed" are registered in the subfields 253 to 255 of the field 251, respectively, the genre of "mood music" and the period of "not specified" are registered. Further, for example, in the subfields 256 and 257 of the field 252 of the record 250 in which an atmosphere of "angry" or "sad", the age group of "*", and a gender ratio of "*" are registered in the subfields 253 to 255 of the field 251, respectively, the genre of "classical" and the period of "not specified" are registered.

The music list acquisition unit 26 uses the listener information (atmosphere, age group, and gender ratio) generated by the listener information generation unit 24 as a search key to retrieve from the genre information storage unit 25 one of the records 250 having genre information of music. Then, the music list acquisition unit 26 generates a music list request involving designation of the genre information (genre and period) registered in the field 252 of the retrieved record 250, and transmits the music list request to the media server 3 via the wireless network interface unit 20 to acquire a music list from the media server 3.

The playlist creation unit 27 creates a playlist based on the music list acquired by the music list acquisition unit 26 from the media server 3. For example, when the number of pieces of music described in the music list is smaller than a predetermined value, the playlist creation terminal 2 sets this music list as the playlist. Meanwhile, when the number of pieces of music described in the music list is equal to or larger than the predetermined value, the playlist creation terminal 2 randomly selects a predetermined number of pieces of music from the music list to create the playlist.

The playlist transmission unit 28 assigns to the playlist created by the playlist creation unit 27 the playlist transmission destination ID set by the playlist transmission destination setting unit 22, and multicasts the resultant playlist from the wireless network interface unit 20.

FIG. 7 is a flowchart for illustrating an operation of the playlist creation terminal 2. This flow is started when the graphical user interface unit 21 receives an instruction to create a playlist from the user.

First, the playlist transmission destination setting unit 22 waits until the ID of any one of the wireless speakers 1 as the playlist transmission destination ID is received from the user via the graphical user interface unit 21 (Step S301). Then, when the playlist transmission destination ID is received (YES in Step S301), the playlist transmission destination setting unit 22 sets this playlist transmission destination ID for the playlist transmission unit 28 (Step S302).

Next, the picked-up image data acquisition unit 23 waits until a photographing operation is received from the user via the graphical user interface unit 21 (Step S303). Then, when the photographing operation is received (YES in Step S303), the picked-up image data acquisition unit 23 uses the camera function of the playlist creation terminal 2 to photograph listeners, to thereby acquire photographing data on the listeners (Step S304).

Next, the listener information generation unit 24 performs face recognition processing on the picked-up image data on the listeners acquired by the picked-up image data acquisition unit 23, to thereby generate listener information including an atmosphere, an age group, and a gender ratio of a listener group of the listeners contained in the picked-up image data (Step S305).

Subsequently, the music list acquisition unit 26 uses the listener information (atmosphere, age group, and gender ratio) generated by the listener information generation unit 24 as a search key to retrieve one of the records 250 from the genre information storage unit 25. Then, the music list acquisition unit 26 determines genre information (genre and period) registered in the field 252 of the retrieved record 250 as the genre information of music to be described in the playlist (Step S306). Then, the music list acquisition unit 26 generates a music list request involving designation of the determined genre information, and transmits this music list request to the media server 3 via the wireless network interface unit 20 to acquire a music list from the media server 3 (Step S307).

Next, the playlist creation unit 27 creates the playlist based on the music list acquired by the music list acquisition unit 26 (Step S308). For example, when the number of pieces of music described the music list is smaller than a predetermined value, the playlist creation terminal 2 sets this music list as the playlist. Meanwhile, when the number of pieces of music described in the music list is equal to or larger than the predetermined value, the playlist creation terminal 2 randomly selects a predetermined number of pieces of music from the music list to create the playlist.

Subsequently, the playlist transmission unit 28 assigns to the playlist created by the playlist creation unit 27 the playlist transmission destination ID set by the playlist transmission destination setting unit 22, and multicasts the resultant playlist from the wireless network interface unit 20 (Step S309).

In the above, one embodiment of the present invention has been described.

In this embodiment, the playlist creation terminal 2 creates the listener information based on the picked-up image data on a listener, and selects pieces of music data from among pieces of music data belonging to the genre information associated in advance with this listener information to create a playlist. Thus, the playlist can be created automatically just by picking up the image of the listener by the user. Therefore, according to this embodiment, it is possible to alleviate a user's workload in creating a playlist.

Further, the playlist creation terminal 2 performs face recognition processing on the picked-up image data to generate the listener information including the atmosphere, the age group, and the gender ratio of a listener group of listeners contained in the picked-up image data. Thus, even when a plurality of listeners are contained in the picked-up image data, pieces of music data satisfying a larger number of listeners can be selected to create the playlist, and hence it is possible to further alleviate a user's workload in creating a playlist.

Further, the present invention is not limited to the above-mentioned embodiment, and various changes may be made thereto within the scope of the gist of the invention.

For example, in the embodiment described above, the listener information includes the atmosphere, the age group, and the gender ratio, but the listener information is only required to include at least one of the atmosphere, the age group, or the gender ratio.

Further, in the embodiment described above, the playlist creation terminal 2 multicasts the playlist to each of the wireless speakers 1-1 to 1-3, but may be configured to unicast the playlist to each wireless speaker, for example, instead of multicasting the playlist.

Further, in the embodiment described above, the playlist creation terminal 2 creates the playlist based on the picked-up image data on a listener, but may be configured to create the playlist in consideration of, in addition to the picked-up image data, for example, a temporal factor such as daytime or nighttime, and/or a seasonal factor such as spring, summer, autumn, winter, Christmas, or New Year's holiday.

Further, in the embodiment described above, the playlist creation terminal 2 receives the ID of the wireless speaker 1 to which the playlist is to be transmitted from the user via the graphical user interface unit 21, but the present invention is not limited thereto. The ID of the wireless speaker 1 may be acquired by, for example, attaching a QR code (trademark) representing the ID of the own wireless speaker 1 to the wireless speaker 1, and photographing the QR code with the camera of the playlist creation terminal 2. As another example, the playlist creation terminal 2 and the wireless speaker 1 may be provided with a short-range wireless communication function, for example, RFID, so as to allow the wireless speaker 1 to use the short-range wireless communication to transmit the ID of the own wireless speaker 1 to the playlist creation terminal 2.

Further, in the embodiment described above, the listener information is generated by performing face recognition processing on the picked-up image data on a listener, but the listener information may be generated by performing image recognition processing other than face recognition processing. For example, the atmosphere of a listener group may be identified by performing appearance recognition processing on the picked-up image data on listeners to extract a feature (e.g., casual, formal, or color) of clothes of each listener, and determining which of classifications defined in advance the extracted feature belongs to. With this configuration, for example, when none of the facial expressions of the listeners can be identified, the atmosphere of the listener group may be identified based on the feature of clothes of the listeners in place of the facial expressions of the listeners.

Further, in the embodiment described above, the playlist creation terminal 2 generates listener information and creates a playlist, but the media server 3 may generate listener information and create a playlist.

Specifically, the listener information generation unit 24, the genre information storage unit 25, the music list acquisition unit 26, and the playlist creation unit 27 are removed from the playlist creation terminal 2, and those processing units are added to the media server 3. Further, the playlist creation terminal 2 transmits the picked-up image data on a listener acquired by the picked-up image data acquisition unit 23 from the wireless network interface unit 20 to the media server 3. In the media server 3, the listener information generation unit 24 performs face recognition processing on the picked-up image data received from the playlist creation terminal 2 to generate listener information, and the music list acquisition unit 26 creates a music list of music data belonging to genre information that is stored in the genre information storage unit 25 in association with the listener information generated by the listener information generation unit 24. Then, the playlist creation unit 27 creates a playlist from the music list created by the music list acquisition unit 26, and the playlist is transmitted to the playlist creation terminal 2. In response to this, in the playlist creation terminal 2, the playlist transmission unit 28 assigns a playlist transmission destination ID to the playlist, and the playlist is multicast from the wireless network interface unit 20.

Further, in the embodiment described above, the case in which the playlist creation terminal 2 is connected to the network 5 via a wireless network is taken as an example for description, but the playlist creation terminal 2 may be directly connected to the network 5 without the intermediation of a wireless network.

Further, in the embodiment described above, the media server 3 is connected to the network 5, but the media server 3 may be connected to a wireless network. Further, the media server 3 may be built into the playlist creation terminal 2, or may be built into any one of the wireless speakers 1.

Further, in the embodiment described above, the playlist creation terminal 2 transmits the playlist to the wireless speaker 1, but the present invention is not limited thereto. The playlist is only required to be transmitted to a predetermined audio device having a function of playing back music data in accordance with the playlist.

REFERENCE SIGNS LIST 1, 1-1 to 1-3: wireless speaker, 2: playlist creation terminal, 3: media server, 4: access point, 5: network, 10: wireless network interface unit, 11: playlist reception unit, 12: playlist storage unit, 13: music data acquisition unit, 14: music data storage unit, 15: music data playback unit, 16: speaker unit, 20: wireless network interface unit, 21: graphical user interface unit, 22: playlist transmission destination setting unit, 23: picked-up image data acquisition unit, 24: listener information generation unit, 25: genre information storage unit, 26: music list acquisition unit 27: playlist creation unit, 28: playlist transmission unit

The invention claimed is:

1. A wireless audio system, comprising:
a playlist creation device, which is configured to create a playlist of music, the playlist creation device further comprising:
    picked-up image data acquisition means for acquiring picked-up image data on a listener;
    listener information generation means for performing image recognition processing on the picked-up image data acquired by the picked-up image data acquisition means to generate listener information including at least one of a facial expression, an age group, or a gender of the listener contained in the picked-up image data;
    music list acquisition means for acquiring, from a server that stores music data, a music list of music data belonging to a genre associated in advance with the listener information generated by the listener information generation means;
    playlist creation means for creating a playlist based on the music list acquired by the music list acquisition means; and
    playlist transmission means for transmitting the playlist created by the playlist creation means to a predetermined audio device; and
a wireless speaker having an audio playback function,
wherein the playlist transmission means of the playlist creation device is configured to wirelessly transmit a playlist created by the playlist creation means to the wireless speaker, and
wherein the wireless speaker includes:
    playlist reception means for receiving the playlist transmitted wirelessly from the playlist creation device;
    music data acquisition means for acquiring, from a server that stores the music data, music data on music described in the playlist received by the playlist reception means; and
    playback-and-output means for playing back for output the music data acquired by the music data acquisition means in accordance with the playlist received by the playlist reception means.

2. A wireless audio system according to claim 1,
wherein the wireless speaker includes a plurality of wireless speakers each having an identification number assigned thereto,
wherein the playlist transmission means of the playlist creation device is configured to assign, to the playlist created by the playlist creation means, identification information of one of the plurality of wireless speakers that is requested to play back music, and to wirelessly transmit the playlist to the plurality of wireless speakers, and
wherein the playlist reception means of each of the plurality of wireless speakers is configured to accept the playlist transmitted wirelessly from the playlist creation device when the identification information assigned to the playlist is identification information of the each of the plurality of wireless speakers.

* * * * *